April 30, 1940. A. T. UNDERWOOD 2,199,355
MEANS FOR AND METHOD OF COOLING GLASS TANK WALLS
Filed June 17, 1937
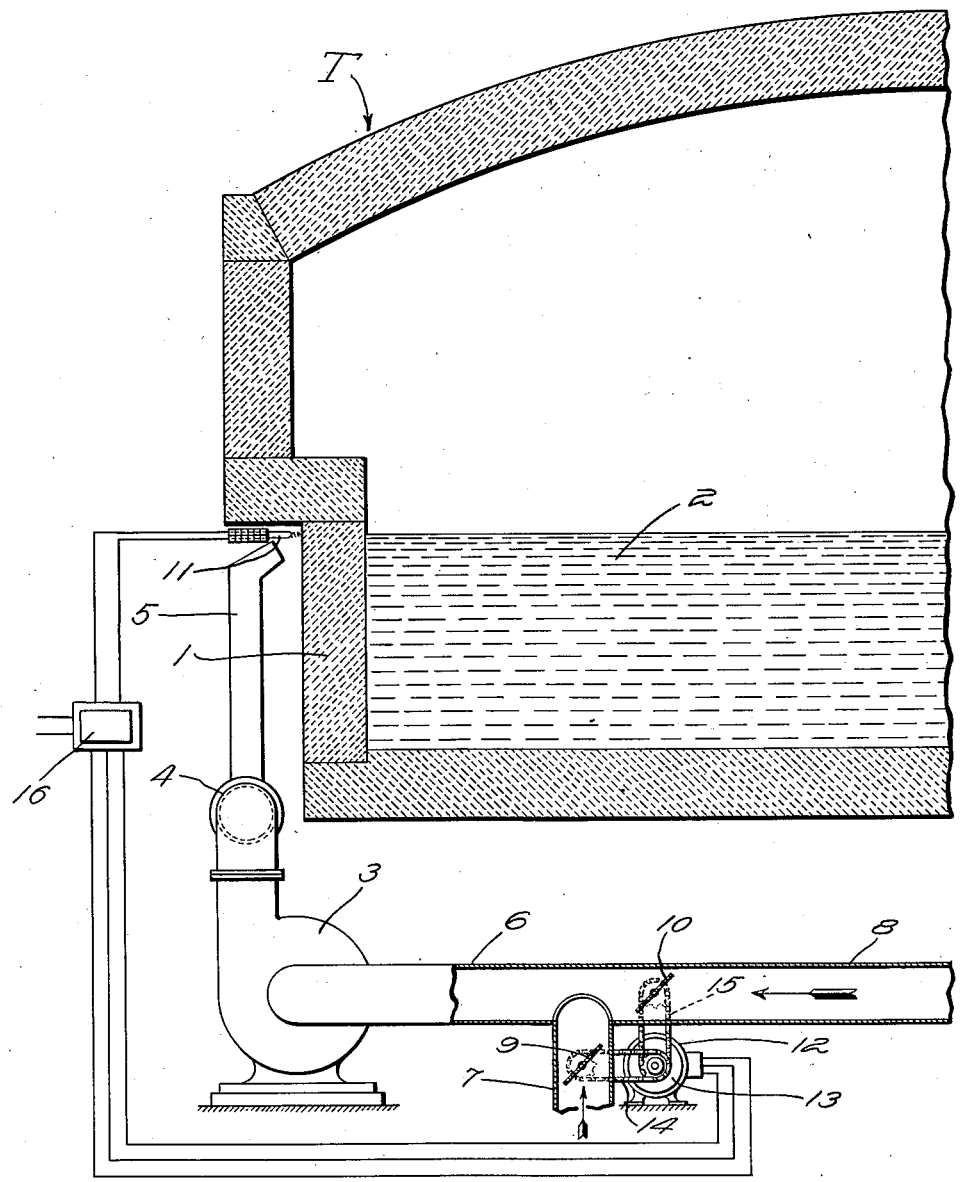
Witness:
W. B. Thayer.
Inventor:
Albert T. Underwood
by Brown + Parham
Attorneys Patented Apr. 30, 1940

2,199,355

UNITED STATES PATENT OFFICE 2,199,355

MEANS FOR AND METHOD OF COOLING GLASS TANK WALLS

Albert T. Underwood, Hartford, Conn., assignor to Hartford-Empire Company, Hartford, Conn., a corporation of Delaware Application June 17, 1937, Serial No. 148,636

8 Claims. (Cl. 49—54)

External cooling of the side walls of a glass melting tank at or about the level of the glass in such tank is well known. It is usual to effect such cooling by blowing against the tank outer side walls a cooling medium, usually atmospheric air obtained from the air outside the factory.

A substantial change in the cooling effect on a wall of the tank to which such a cooling medium is being applied will produce an undesirable change in the condition or quality of the glass in the tank.

A change of weather may produce such a substantial change of cooling effect on the walls of the tank as will produce an undesirable change in the glass such as above referred to. Thus, relatively cool weather followed by warmer weather will cause a lessening of the cooling effect because the atmospheric air applied to the tank walls will be warmer. A possible explanation of this phenomenon is that the relatively viscous glass in the tank next to the walls thereof, which has been moving sluggishly and has absorbed a relatively large amount of alumina from the refractory tank blocks, will be heated to a higher temperature and caused to move more rapidly, thereby introducing bands of streaks of glass of high alumina content into the main body of glass in the tank. As a consequence, glass supplied by the tank may contain undesirable striae and "cords," and for this reason may be unsatisfactory for manufacture into satisfactory articles of glassware.

An object of the invention is to maintain the cooling effect on a wall of a glass melting tank substantially constant irrespective of changes of conditions which otherwise would substantially change such cooling effect.

A more specific object of the invention is to provide a cooling effect at the outer surface of a side wall of a glass melting tank at or about the level of the glass in the tank by the application to such wall of a cooling fluid and automatically to vary the cooling characteristics of that fluid to obviate or overcome any change of cooling effect from that desired.

Another object of the invention is to provide for the maintenance of a substantially uniform cooling effect on the wall of a glass melting tank at or about the level of the glass in the tank despite changes of weather which tend to change such cooling effect.

Other objects and advantages of the invention will hereinafter be pointed out or will become apparent from the following description of a practical embodiment of the invention, as shown in the accompanying drawing, in which The view is a transverse vertical section through a part of a melting tank, showing apparatus for blowing a cooling medium against a side wall of the tank and equipped with automatic control means for varying the temperature of the cooling medium to obviate or overcome any substantial change of cooling effect at the place at which such cooling medium is applied.

In the drawing, a glass melting tank T has a side wall 1 which is to be cooled externally at or about the level of the body of molten glass 2 in the tank. Apparatus for applying cooling air to this portion of the tank wall may comprise a blower fan 3, an air delivery manifold 4 connected therewith, and cooling air nozzles, one of which is shown at 5, for blowing cooling air against the tank wall. The intake side of the blower fan is connected with an intake and mixing pipe 6 which is supplied with relatively cool air by a supply pipe 7 and with hotter air by another supply pipe 8. The pipe 7 may lead to the exterior of the factory in which the tank is located and may be open to the atmosphere at such place or at any other place at which such air is available. The pipe 8 may be connected with any suitable source of supply of hot air.

The supply pipes 7 and 8 are provided with separate adjustable dampers, designated 9 and 10, respectively. The settings or adjusted positions of these dampers at any time will determine the ratio of cool atmospheric air to hot air in the mixture delivered by the fan to the cooling air nozzles and hence the cooling effect at the side wall of the tank. In order that this cooling effect may be kept substantially uniform, I provide mechanism for automatically adjusting the dampers 9 and 10 to compensate for and overcome any substantial change of cooling effect at the tank wall. Such mechanism may comprise a suitable thermostat 11, such as a thermocouple, located at the place at which the cooling effect is being produced by the cooling air, a reversible motor 12 connected operatively with the dampers 9 and 10, as by a speed reduction unit 13 and the chain and sprocket arrangements 14 and 15, and suitable electrical connections and instruments, including a pyrometer 16, between the motor and the thermo-couple. These parts have all been shown more or less diagrammatically, since they do not per se form part of the invention, but may be of any suitable known construction and may be readily provided by those skilled in the art. The arrangement is such that the operation of the motor will adjust the dampers 9 and 10 simultaneously but in opposite directions. Turning of the drive shaft of the motor in one direction will impart an opening movement to one of these dampers and a closing movement to the other. Reversal of the motor will reverse the movements of the dampers.

In operation, the dampers 9 and 10 are set to adjust the volumes of cool and hot air of the supply mixture, so as to produce a desired cooling effect as the cooling mixture is discharged against the tank wall. The pyrometer is set to maintain this cooling effect substantially constant. The motor will remain inactive until a change of weather or of any other controlling condition has caused a substantial departure from this cooling effect. If, for example, the weather should change so that the cooling air mixture will be at a higher temperature, the thermo-couple will respond to the decreased cooling effect and will act through the agency of the pyrometer to adjust the dampers 9 and 10, so that the ratio of cool air to hot air will be increased. Lowering the temperature of the cooling air mixture to a substantial extent will cause a reverse operation of the motor and reverse adjustments of the dampers. The cooling effect of the cooling air mixture on the wall of the tank will thus be maintained substantially uniform or at least sufficiently so to prevent impairment of the quality or condition of the glass in the tank.

It is within the purview of the invention to maintain the cooling effect on the wall of the tank substantially uniform by regulably controlling in any suitable way the cooling characteristics of the cooling medium that is applied to such wall. The invention is not to be limited beyond the scope indicated by the terms of the appended claims.

I claim:

1. The combination of means for locally cooling a portion of a side wall of a glass melting tank at the exterior of said wall by applying thereto a cooling medium, means for continuously measuring the temperature at a control point adjacent to said place of application of said cooling medium, and means operated by said means for continuously measuring the temperature at said control point for changing the cooling characteristics of said cooling medium to compensate for temperature changes at said control point from a predetermined temperature.

2. The combination with a wall of a glass melting tank of means for applying a mixture of relatively cool air and hotter air to said wall to cool locally a portion of the latter, and means for varying the ratio of said components of said mixture to vary the cooling effect thereof in accordance with a change of temperature at a control point adjacent to the place of application of said mixture from a predetermined desirable temperature.

3. The combination with a wall of a glass melting tank of means for applying a mixture of relatively cool air and hotter air to said wall to cool locally a portion of the latter, and means acting automatically in response to a lowering of temperature from that desired at said place of application of said mixture to vary the ratio of said components of said mixture to decrease the cooling effect thereof and in response to a rise of temperature at said place to vary the ratio of said components to increase the cooling effect of said mixture.

4. The combination with a wall of a glass melting tank of means for applying a mixture of relatively cool air and hotter air to a said wall to cool locally a portion of the latter, means for adjusting the ratio of said components of said mixture, a thermostat adjacent to the place of application of said mixture to said wall, and means controlled by said thermostat for actuating said means for adjusting said ratio to vary the same to compensate for changes of temperature adjacent to said thermostat from a predetermined desirable temperature.

5. Apparatus for cooling a wall of a glass melting tank comprising an air nozzle located in position to apply air to the exterior of a portion of said wall, means including a blower fan and hot air and cooler air supply ducts connected with the intake side of said fan for blowing a cooling mixture of said hot air and cooler air through said nozzle, adjustable dampers in said hot air and cooler air supply ducts, a thermostat adjacent to said place of application of said cooling mixture to said wall, and means controlled by said thermostat for automatically controlling the adjustments of said dampers as required to maintain the temperature at said thermostat at approximately a predetermined level.

6. Apparatus for cooling a wall of a glass melting tank comprising an air nozzle located in position to apply air to the exterior of a portion of said wall, means including a blower fan and hot air and cooler air supply ducts connected with the intake side of said fan for blowing a cooling mixture of said hot air and cooler air through said nozzle, adjustable dampers in said hot air and cooler air supply ducts, a thermostat adjacent to said place of application of said cooling mixture to said wall, a reversible motor operatively connected with said dampers for adjusting them simultaneously in opposite directions, and electrical means controlled by said thermostat for operating said motor.

7. That improvement in the art of operating a glass melting tank which comprises cooling a side wall of the tank at about the glass line by applying a cooling mixture of relatively cool air and hotter air locally to the outer surface of said portion of said side wall, and regulating the ratio of said components of said cooling mixture in accordance with changes from a predetermined temperature at the place of application of said cooling mixture.

8. That improvement in the art of operating a glass melting tank which comprises cooling a side wall of the tank at about the glass line by applying a cooling mixture of selected volumes of relatively cool and hotter air locally to the outer surface of said portion of said tank wall, continuously measuring the temperature at a control point adjacent to said place of application of said cooling mixture with respect to a predetermined desirable temperature, and altering the relative volumes of the relatively cool and hotter components of said mixture in accordance with substantial departures at said control point from said predetermined desirable temperature.

ALBERT T. UNDERWOOD.